(12) United States Patent
Keys

(10) Patent No.: US 11,006,099 B2
(45) Date of Patent: *May 11, 2021

(54) VIEWING OF DIFFERENT FULL-SCREEN TELEVISION CONTENT BY DIFFERENT VIEWERS AT THE SAME TIME USING A RELATED DISPLAY

(71) Applicant: Jeramie J. Keys, Roswell, GA (US)

(72) Inventor: Jeramie J. Keys, Roswell, GA (US)

(73) Assignee: Panther Innovations, LLC, Tyler, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,208

(22) Filed: Nov. 6, 2019

(65) Prior Publication Data

US 2020/0280716 A1 Sep. 3, 2020

Related U.S. Application Data

(63) Continuation of application No. 15/649,159, filed on Jul. 13, 2017, now Pat. No. 10,477,195, which is a continuation of application No. 12/983,223, filed on Dec. 31, 2010, now Pat. No. 9,712,811.

(60) Provisional application No. 61/378,941, filed on Sep. 1, 2010.

(51) Int. Cl.
*H04N 13/341* (2018.01)

(52) U.S. Cl.
CPC .............................. *H04N 13/341* (2018.05)

(58) Field of Classification Search
CPC ..................... H04N 13/0436; H04N 13/0438
See application file for complete search history.

(56) References Cited

U.S. PATENT DOCUMENTS

| | | | | | |
|---|---|---|---|---|---|
| 5,470,080 | A | * | 11/1995 | Naka | A63F 13/10 |
| | | | | | 463/33 |
| 5,963,371 | A | * | 10/1999 | Needham | G02B 30/24 |
| | | | | | 359/464 |
| 10,477,195 | B2 | * | 11/2019 | Keys | H04N 13/341 |
| 2001/0015753 | A1 | * | 8/2001 | Myers | G02B 5/045 |
| | | | | | 348/51 |
| 2002/0196332 | A1 | * | 12/2002 | Lipton | H04N 13/398 |
| | | | | | 348/51 |

(Continued)

*Primary Examiner* — Mainul Hasan
(74) *Attorney, Agent, or Firm* — Withers & Keys, LLC

(57) ABSTRACT

Different full screen content is displayed on the same television at the same time from the perspective of the viewer by displaying as the content as two full screen sequential frames. The different full screen content may be provided as a single combined frame signal such as a side-by-side, top-bottom, or checkerboard signal which is then displayed as two sequential full screen frames. Configured glasses such as polarized or shutter are used to view the different content as full screen content where one pair of configured glasses views an initial one of the sequential frames but blocks the subsequent one and another pair of configured glasses blocks the initial one of the sequential frames and views the subsequent one. Shutter glasses have both lenses open during the initial frame and both closed during the subsequent one. For polarized glasses, the initial frame has a polarization matching both lenses of one pair of glasses while the subsequent frame has a polarization that differs from both lenses.

10 Claims, 7 Drawing Sheets

(56) References Cited

U.S. PATENT DOCUMENTS

| | | | | |
|---|---|---|---|---|
| 2004/0109093 A1* | 6/2004 | Small-Stryker | ...... | H04N 13/337 348/739 |
| 2008/0165176 A1* | 7/2008 | Archer | ...... | A63F 13/52 345/213 |
| 2010/0007582 A1* | 1/2010 | Zalewski | ...... | H04N 13/383 345/8 |
| 2011/0286530 A1* | 11/2011 | Tian | ...... | H04N 19/61 375/240.25 |
| 2012/0026157 A1* | 2/2012 | Unkel | ...... | H04N 13/356 345/419 |

* cited by examiner

VIEWING OF DIFFERENT FULL-SCREEN TELEVISION CONTENT BY DIFFERENT VIEWERS AT THE SAME TIME USING A RELATED DISPLAY

RELATED APPLICATIONS

The present application is a continuation of U.S. application Ser. No. 15/649,159, now U.S. Pat. No. 10,477,195, filed on Jul. 13, 2017, which is a continuation of U.S. application Ser. No. 12/983,223, filed on Dec. 31, 2010, now U.S. Pat. No. 9,712,811, which claims priority to U.S. Provisional Application No. 61/378,941, filed on Sep. 1, 2010, and entitled Viewing of Different Full-Screen Television Content by Different Viewers At the Same Time Using Shutter Glasses and Related Display Timing, which is incorporated by reference herein.

TECHNICAL FIELD

Embodiments relate to viewing television content such as television programs or video games. More particularly, embodiments relate to viewing different full-screen television content by different viewers at the same time by the viewers using configured glasses such as shutter glasses or polarized glasses.

BACKGROUND

Viewers of television content on a particular television conventionally view the same content as other viewers watching the same television at the same time. However, in some cases, it may be desirable for one or more viewers to see television content that differs from the television content being seen by one or more other viewers watching the same television at the same time. For instance, two individuals may desire to watch the same television at the same time but may one individual may wish to watch one program while the other individual may wish to watch a different program. As another example, two users may be playing a video game on the same television at the same time where each user has a user specific view of the game content.

Conventionally, when two viewers desire to watch different programs on the television at the same time, they resort to a picture-in-picture approach. However, both users see both pictures and one or both of the pictures are less than full-screen. When two viewers desire to play a multi-player game with user specific view of the game content, they resort to a game setting that provides a split screen presentation in either a top-bottom arrangement or a side-by-side arrangement where player 1 content is typically in a top or left half while player 2 content is typically in a bottom or right half of the screen. However, both users see both halves of the screen and thus see both user specific content displays, and the user specific content displays are each one half of a full screen. While these approaches provide a solution to different content being display for different users on a single television at the same time, both users being able to see both content regions is a drawback, and each content region being less than full screen is also a drawback.

SUMMARY

Embodiments address issues such as these and others by providing a system where a source device provides a signal, such as a split screen or checkerboard signal, that is the combination of two 2D content regions. Split screen may include such variants as top-bottom, frame-packed, or side-by-side. The two 2D content regions may be originally less than full-screen, such as in a typical video game split screen, or may originally be full screen content that is either downscaled or frame packed into a single video frame in the split screen or checkerboard format. A display device capable of rendering a split screen or checkerboard format signal as two full screen sequential frames, an odd frame showing one content region in full screen followed by an even frame showing the other content region in full screen, and so on.

In one instance, a first user wearing a pair of shutter glasses has the shutter glasses synced to a television display so that both lenses are open to allow viewing of the odd frames but are closed to block the even frames. A second user wearing a pair of shutter glasses has the shutter glasses synced to a television display so that both lenses are open to allow viewing of the even frames but are closed to block the odd frames.

In another instance, a first user wearing a pair of polarized glasses that have one polarization where a television display provides the odd frames with a matching polarization and even frames with a non-matching polarization such that the first user only sees the odd frames. A second user wearing a pair of polarized glasses that have another polarization where the television display provides the odd frames with a non-matching polarization and even frames with a matching polarization such that the second user only sees the even frames.

DETAILED DESCRIPTION

Embodiments provide for multiple viewers to view different full-screen content at the same time on a single television. The embodiments include a source device that produces 2D signals having one type of content in one region of the frame for one viewer and another type of content in another region for another viewer. The embodiments include a display device that receives the 2D signal and extracts the content in one region of the frame to create odd full frames of content for viewing by the one viewer and extracts the content in the other region of the frame to create even full frames of content for the other viewer. In one instance, each viewer wears shutter glasses that are synced so that only the odd frames or only the even frames are viewable. In another instance each viewer wears polarized glasses that are polarized in correspondence with the polarization of the television display so that only the odd frames or only the even frames are viewable.

Figure 1:
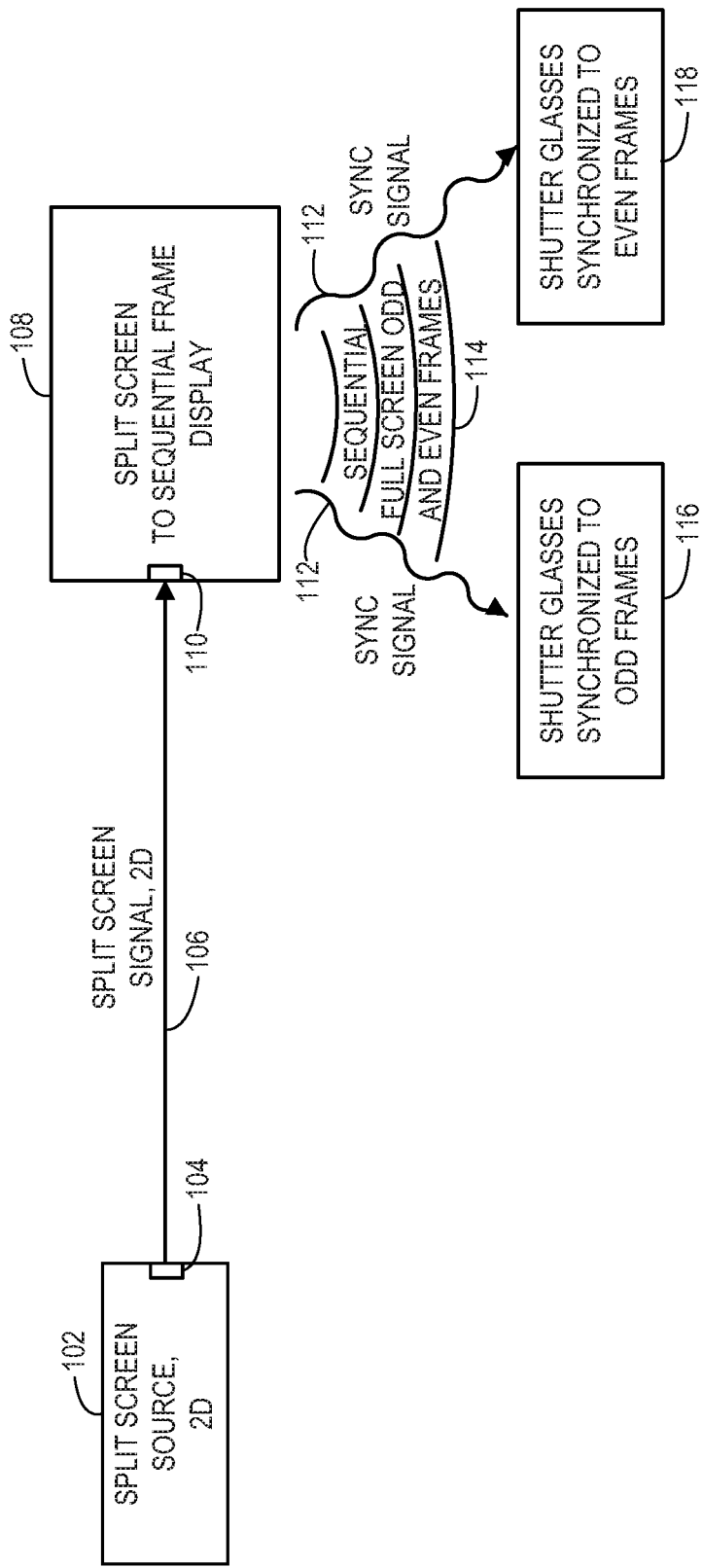
FIG. 1 shows one system using a split screen source with a split screen capable display device.

FIG. 1 shows a split screen source 102 for a 2D signal, such as a dual feed set top box, a multi-player game console, or a separate device that receives two separate full screen signals from other source devices and combines them into a split screen format. The split screen source has an output 104, such as a high definition multimedia interface (HDMI) port. This output 104 sends a split screen signal, such as a top-bottom signal, a side-by-side signal, or a frame packed signal which happens to include two regions of 2D content. This signal 106 carrying two regions of 2D content is to be distinguished from a 3D signal, which might use split screen to carry two regions of content that form a 3D display when one eye views one frame derived from one region while another eye subsequently views another frame derived from the other region.

A display device 108 includes an input 110, such as an HDMI port that receives the split screen signal 106. The display device 108, such as a 3D television is made to operate in a side-by-side, top-bottom, or frame packed 3D mode that matches the format of the split screen signal 106. So, for a side-by-side split screen signal of 2D content, the 3D television operates in the 3D side-by-side mode. For a top-bottom split screen signal of 2D content, the 3D television operates in the 3D top-bottom mode. For a frame packed split screen signal of 2D content, the 3D television operates in the 3D frame packed mode. In the proper mode, the display device 108 converts the split screen signal 106 into two sequential full screen frames where both may be sequentially displayed in the same amount of time a single frame would ordinarily be displayed. One region of the signal 106 forms the first full screen frame while the other region of the signal 106 forms the second full screen frame. For instance, one region may be the top half of the split screen frame while the other region may be the bottom half of the split screen frame. As another example, one region may be the left half of the split screen frame while the other region may be the right half of the split screen frame. Where the split screen frame is a normal display resolution of the display device 108, the display device 108 may upscale each region when creating the full screen frame, such as by stretching horizontally or vertically to fill the full screen. Where the split screen is double the display resolution of the display device 108, such as for a frame packed split screen signal that has double the vertical resolution or double the horizontal resolution such that each region is already in the full screen resolution of the display device 108, the display device 108 may display each region in its native resolution as a full screen frame.

In the case of some video games, the split screen frame may be created by maintaining the geometry of the content within a given region but reducing the amount of content space being displayed by one half of the frame. In that case, the display device 108 fills the full screen by upscaling the content from the region of the split screen frame which will alter the geometry of the content and give the appearance of the content being stretched. For instance, a top-bottom signal may use normal geometry but display only half the content space as only half the vertical resolution is available. When displayed in full screen, the content appears stretched vertically in order to fill the full screen. Likewise, a side-by-side signal may use normal geometry but display only half the content space as only half the horizontal resolution is available. When displayed in full screen, the content appears stretched horizontally in order to fill the full screen.

In the case of other video games, the split screen frame may be created by altering the geometry of the content within a given region but maintaining the amount of content space being displayed by one half of the frame. In that case, the display device 108 fills the full screen by upscaling the content from the region of the split screen frame which will return the content to a normal geometry when being displayed, and therefore, appear normal rather than stretched. For instance, a top-bottom signal may use altered geometry where content space and objects appear to have half the vertical size as normal but display the full content space as only half the vertical resolution is available. When displayed in full screen, the content appears to have a full vertical size when filling the full screen. Likewise, a side-by-side signal may use altered geometry where content space and objects appear to have half the horizontal size as normal but display the full content space as only half the horizontal resolution is available. When displayed in full screen, the content appears to have a full horizontal size when filling the full screen.

The odd and even full screen frames 114 created from the two regions of the split screen frame are displayed in sequence. The display device 108 also produces a synchronization signal 112, such as a Digital Light Processing (DLP) Link Signal emanating from the display screen in the case of a 3D or 3D ready DLP television or alternatively a signal that emanates from an infra-red or radio frequency emitter of a 3D or 3D ready television.

In one instance the viewers wear shutter glasses, 116 and 118. A first viewer wears shutter glasses 116 and has the glasses synced to the display device 108 via the sync signal 112. In order to watch the desired television content with both eyes, both lenses should have the same state. So, when the left lens is open while the content of interest is being displayed as a full frame, the right lens is also open and when the left lens is closed while the content that is not of interest is being displayed as a full frame, the right lens is also closed. Thus, this is a distinction from the operation of shutter glasses being used to view 3D content, where the left and right lenses have opposite states. When the lenses of shutter glasses 116 are open to view content of interest to the viewer wearing the shutter glasses 116, the lenses of the shutter glasses 118 are closed as the content being displayed at that instant is not of interest to the viewer wearing the shutter glasses 118. Likewise, when the lenses of shutter glasses 118 are open to view content of interest to the viewer wearing the shutter glasses 118, the lenses of the shutter glasses 116 are closed as the content being displayed at that instant is not of interest to the viewer wearing the shutter glasses 116. An example of shutter glasses with this capability are the Optoma BG-ZD101 DLP Link glasses by Optoma Technology, Inc., the CrystalEyes 4 and 5 by RealD, Inc. which allow the selection of 3D mode, only odd frames to both eyes for 2D viewing of 3D content, and only even frames to both eyes for 2D viewing of 3D content.

In the context of simultaneous television programs, the viewer wearing shutter glasses 116 watches a first program in full screen, where the odd frames are of a first program and the shutter glasses 116 are open during the odd frames while the shutter glasses 118 are closed. The viewer wearing shutter glasses 118 watches a second program in full screen at the same time, where the even frames are of the second program and the shutter glasses 118 are open during the even frames while the shutter glasses 116 are closed.

In another instance, rather than using shutter glasses, each user may wear polarized glasses where the polarization is the same in both lenses of one pair of glasses for viewing one content while the polarization in another pair of glasses is the same in both lenses but different than the polarization in the first pair of glasses for viewing another content. In this case, the television display provides the frames of one content, such as the odd frames, with a polarization matching the first pair of glasses while the television display provides the frames of the other content, such as the even frames, with a polarization matching the other pair of glasses.

Figure 2:
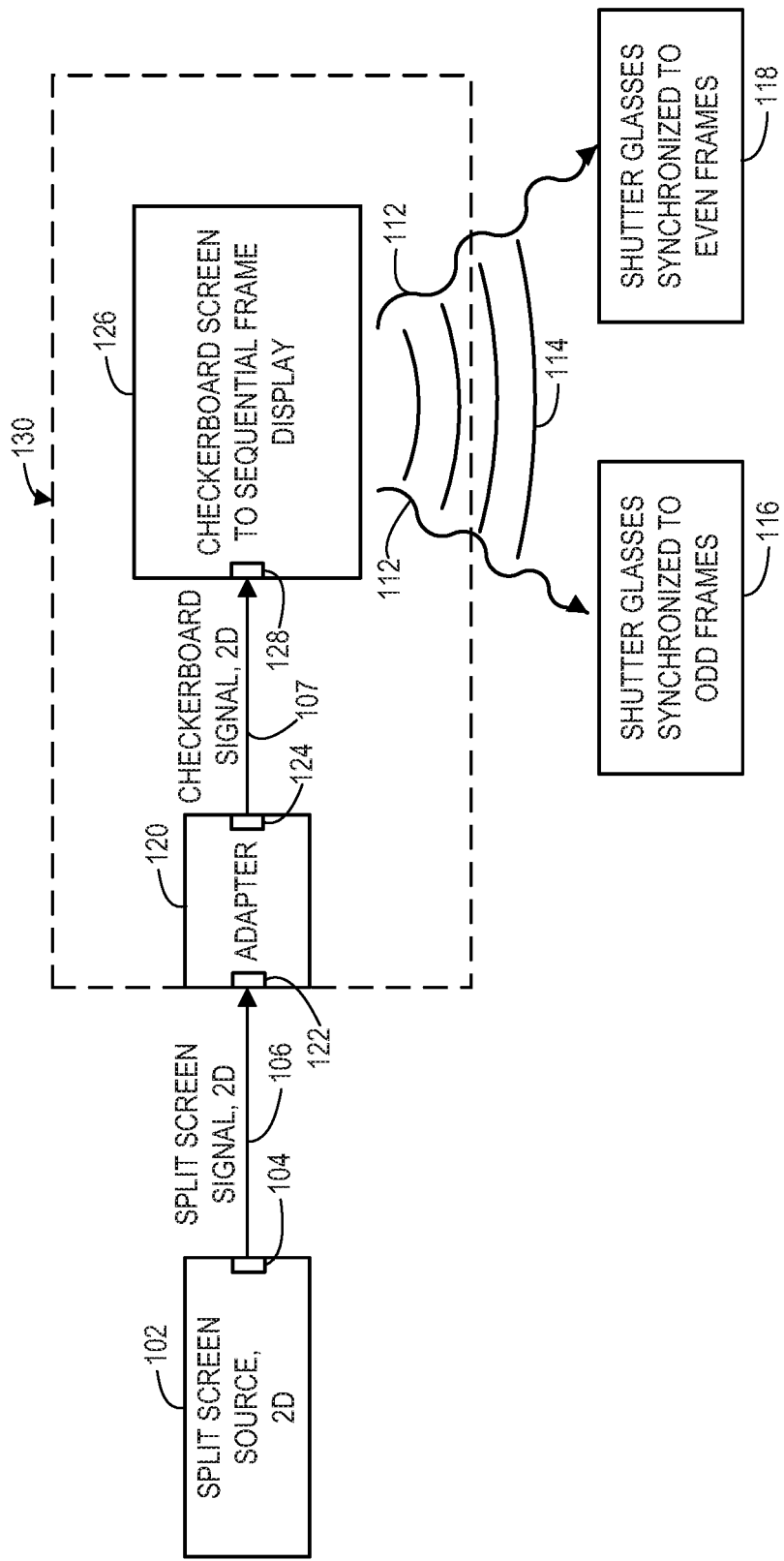
FIG. 2 shows one system using a split screen source, an adapter, and a checkerboard capable display device.

FIG. 2 shows a similar setup except that the display device 126 is only capable of converting a checkerboard format signal into two sequential frames. In this case, the source device 102 is a split screen format source as discussed above for FIG. 1. Therefore, the display device 126 is connected to an adapter 120 that converts a split screen format, such as top-bottom, side-by-side, or frame packed, to a checkerboard format. As a specific example, the display device 126 may be a Mitsubishi Digital Electronics America, Inc. 3D or 3D ready DLP television while the adapter 120 may be a Mitsubishi Digital Electronics America, Inc. 3DA-1 3D adapter. The display device 126 and the adapter 120 may be considered a display device 130.

The adapter 120 includes a port 120 such as an HDMI port that receives the split screen signal. The adapter 120 includes a port 124 such as an HDMI port that outputs a checkerboard signal 107. The display device 126 includes a port 128 such as an HDMI port that receives the checkerboard signal 107. The display device 126 then displays sequential frames where the odd frames correspond to content from one region of the split screen signal while the even frames correspond to content from the other region of the split screen signal. The adapter 120 may be automatically or manually placed into the proper 3D mode, such as top-bottom 3D mode for a top-bottom split screen signal of 2D content, side-by-side 3D mode for a side-by-side split screen signal of 2D content, or frame packed 3D mode for a frame packed split screen signal of 2D content, in order to correctly extract the content from the proper region when constructing the checkerboard format. So, for instance, for a video game in a top-bottom split screen format, either the video signal 106 may provide a flag to instruct the adapter 120 to enter top-bottom 3D mode or the user may manually select the top-bottom 3D mode. The result is that the player 1 content is displayed in full screen as odd frames and the player 2 content is displayed in full screen as even frames, each of which are viewed by the proper player using correctly synced shutter glasses as discussed above for FIG. 1.

Figure 3:
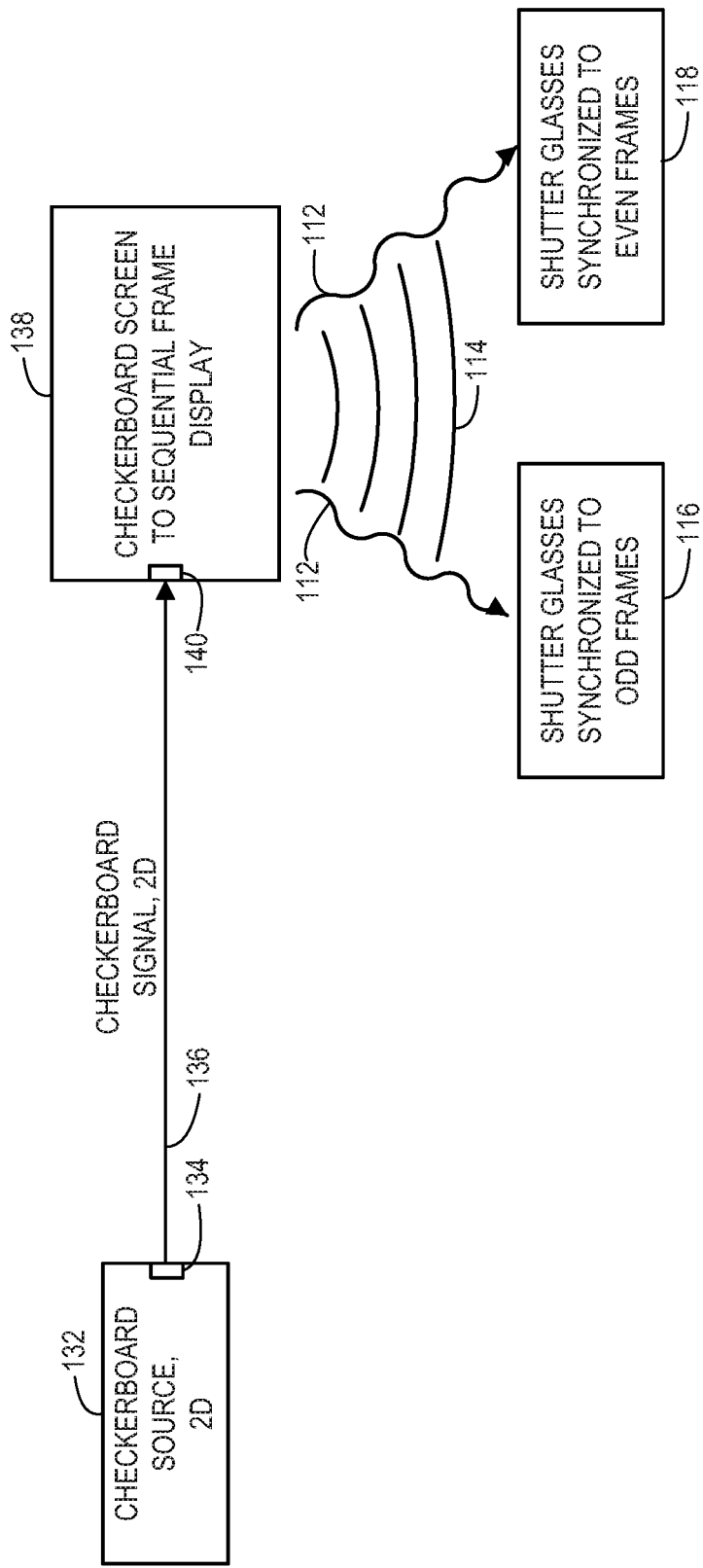
FIG. 3 shows one system using a checkerboard source with a checkerboard capable display device.

FIG. 3 shows a system where the source device 132 is capable of producing a checkerboard signal 136 via a port 134 such as an HDMI port that contains two regions of 2D content. A display device 138 that is checkerboard capable receives the signal 136 via a port 140 such as an HDMI port. The display device then produces the sequential frames as discussed above and the viewers wearing the correctly synced shutter glasses 116 and 118 view the proper content.

In the context of a checkerboard format signal 136, the two regions of 2D content are not contiguous regions. Instead, each region is scattered across the frame in a checkerboard pattern, so pixels of one region would correspond to the red squares of a checkerboard while pixels of the other region would correspond to the black squares. The display device 138 extracts the content for each region based on this checkerboard format to render full screen sequential frames.

Figure 4:
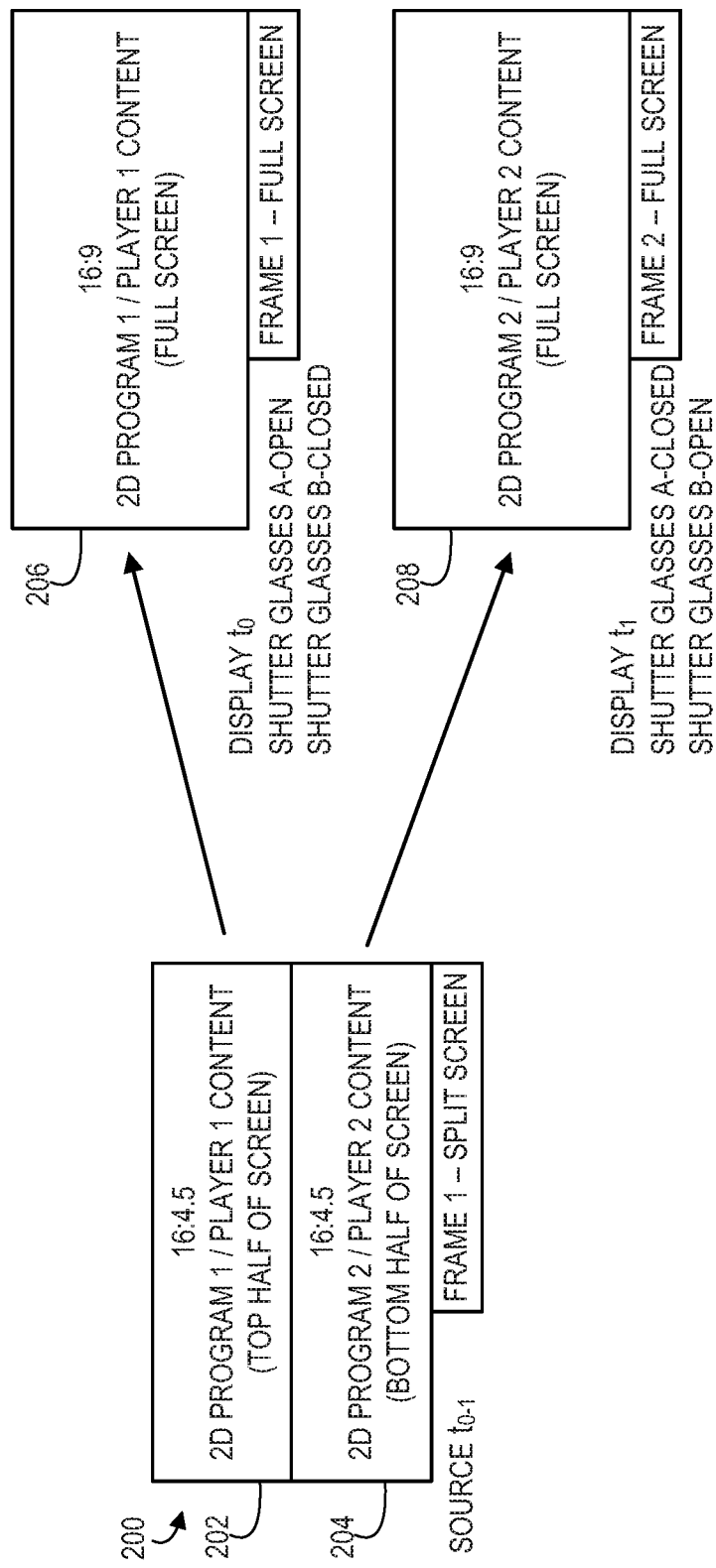
FIG. 4 shows a process of a top-bottom split screen 2D frame being displayed as two sequential full screen frames.

FIG. 4 shows an example of a top-bottom split screen frame 200 having a 16:9 aspect ratio but with each region having a 16:4.5 ratio. There is a top region 202 containing program 1 or player 1 2D content, and a bottom region 204 containing program 2 or player 2 2D content. This split screen frame 200 accounts for t0 and t1 display times. However, this split screen frame 200 is displayed by the top region 202 being full screen 206 for display time t0 with the bottom region 204 being full screen 208 for display time t1. Shutter glasses A are open for t1 but closed for t2 while shutter glasses B are closed for t1 but open for t2. This repeats for the next split screen frame at the normal frame rate, such as 60 progressive split screen frames per second. Thus, two viewers watch different full screen content at the same time on the same television.

It will be appreciated that the same is true for a vertically frame packed split screen frame except that the ratio is 16:18, with each region being 16:9 such that there is no need to upscale to produce a full screen frame at a 16:9 ratio.

It will also be appreciated that polarized glasses may be used instead of shutter glasses where the frame at t0 has one polarization matching that of both lenses of a first pair of glasses while the frame at t1 has a different polarization matching that of both lenses of a second pair of glasses.

Figure 5:
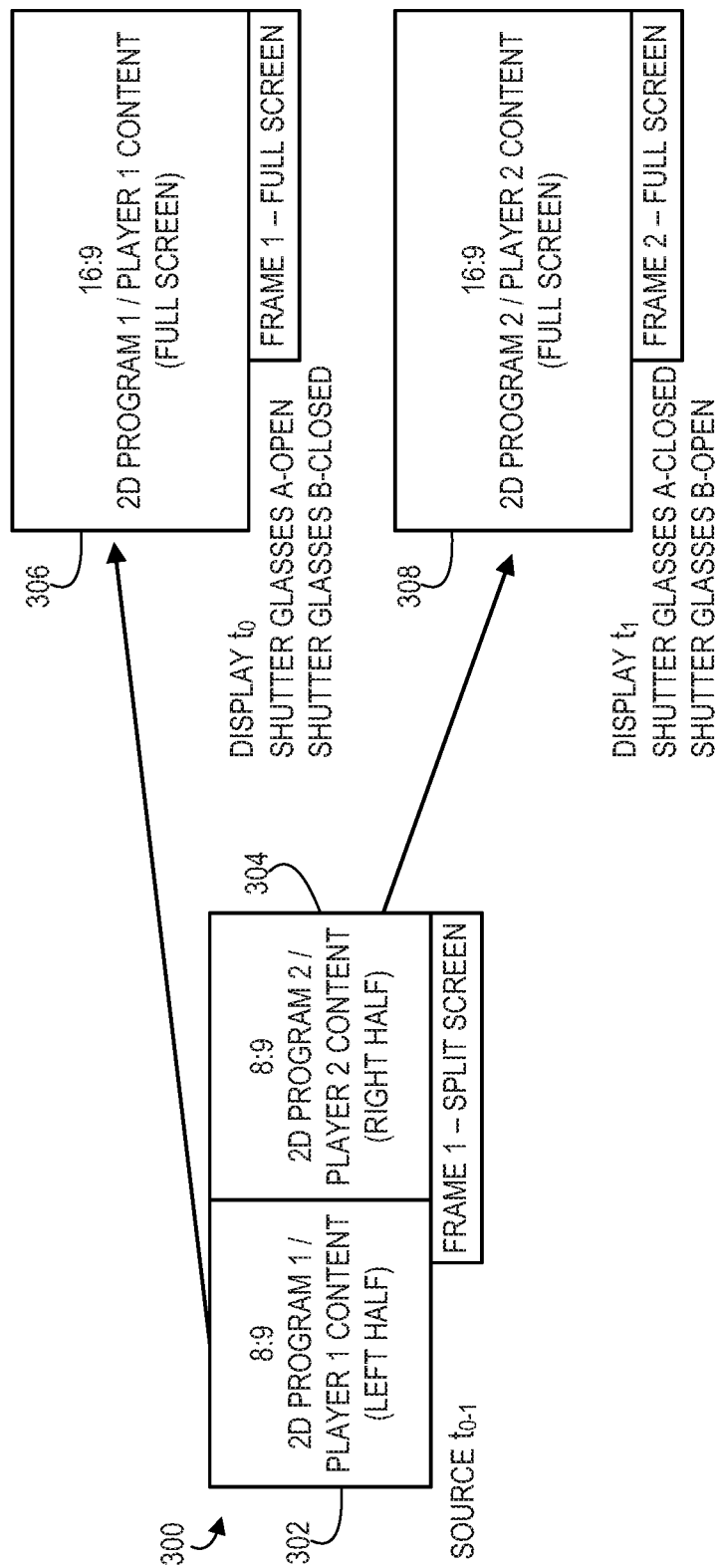
FIG. 5 shows a process of a side-by-side split screen 2D frame being displayed as two sequential full screen frames.

FIG. 5 shows an example of a side-by-side split screen frame 300. There is a left region 302 containing program 1 or player 1 2D content, and a right region 304 containing program 2 or player 2 2D content. This split screen frame 300 accounts for t0 and t1 display times. However, this split screen frame 300 is displayed by the left region 302 being full screen 306 for display time t0 with the right region 304 being full screen 308 for display time t1. Shutter glasses A are open for t1 but closed for t2 while shutter glasses B are closed for t1 but open for t2. This repeats for the next split screen frame at the normal frame rate, such as 60 progressive split screen frames per second. Thus, two viewers watch different full screen content at the same time on the same television.

It will be appreciated that the same is true for a horizontally frame packed split screen frame except that the ratio is 32:9, with each region being 16:9 such that there is no need to upscale to produce a full screen frame at a 16:9 ratio.

It will also be appreciated that polarized glasses may be used instead of shutter glasses where the frame at t0 has one polarization matching that of both lenses of a first pair of glasses while the frame at t1 has a different polarization matching that of both lenses of a second pair of glasses.

Figure 6:
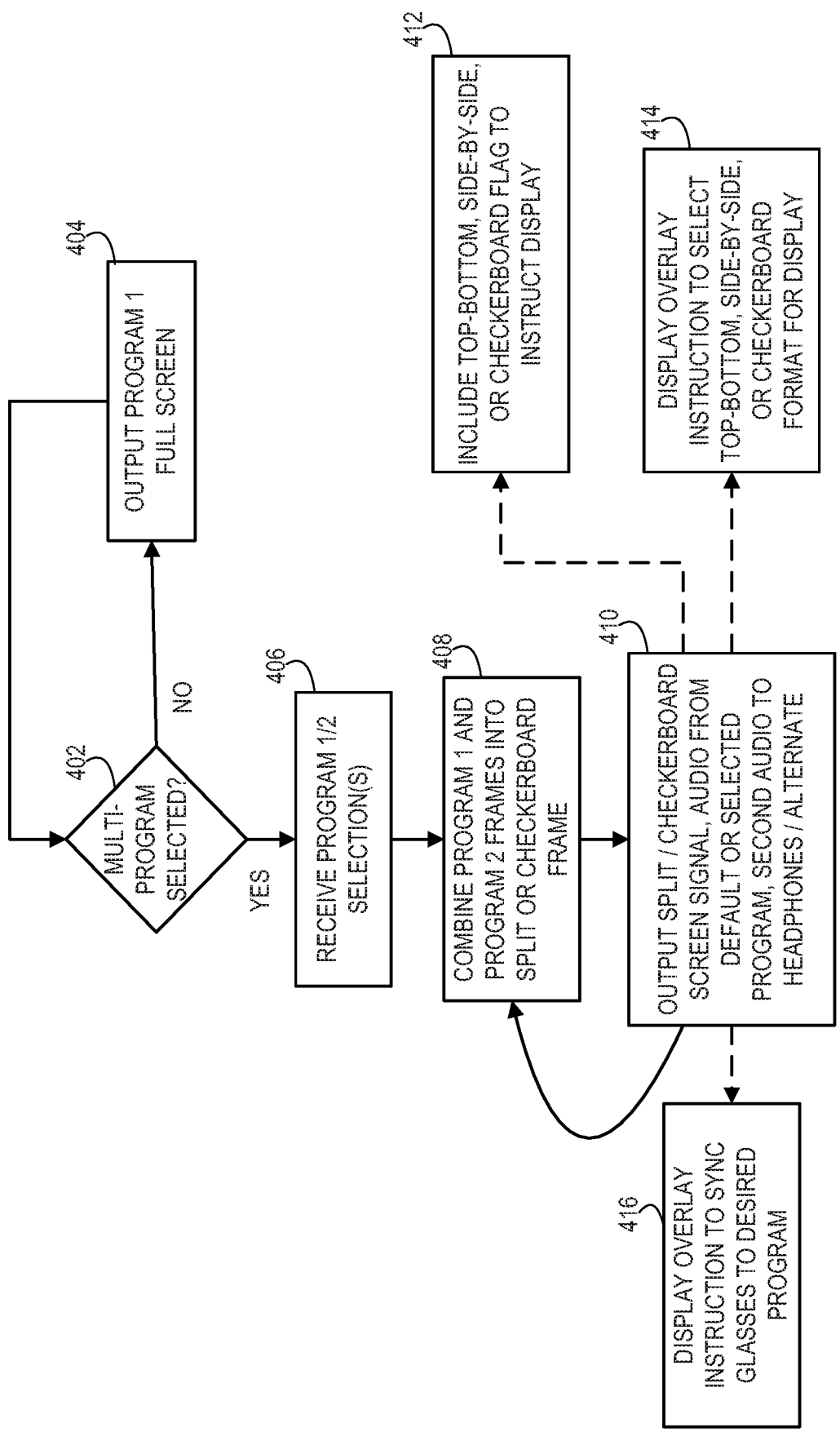
FIG. 6 shows one example of logical operations of a set top box or other content receiving source to generate a multi-program 2D output signal.

FIG. 6 shows an operational flow of one example of a television program source device, such as a set top box from a cable, satellite, or internet provider. Initially, the source device detects whether a selection has been received to provide multiple program displays at once at a query operation 402. If not, then the source device outputs program 1 at full screen at a display operation 404. If such a selection is received, then the source device receives the selections for programs 1 and 2 at a selection operation 406. The source device then combines the frames of programs 1 and 2 into a split screen or checkerboard format signal at a combination operation 408. The source device then outputs the signal to the display device at an output operation 410.

Because separate television programs have separate audio and the audio system may realistically only provide audio from one source via normal speakers, the source device may receive a selection of which audio to output, or may default to outputting audio for one of the two programs. As another feature, the source device may output audio of the other program to a separate audio output such as a headphone jack.

The source device may take additional actions in relation to the multi-program simultaneous output. The source device may include at an insert operation 412 a split screen format flag in the signal being output to the display device to instruct the display device as to which 3D format to enter in order to correctly display the two regions of content as sequential full frames. For instance, the flag may indicate top-bottom, side-by-side, frame packed, or checkerboard. As another example, the source device may produce an overlay that instructs the user to select the proper 3D mode to correctly display the two regions of content as sequential full frames at an overlay operation 414. As another example, in the case of using shutter glasses the source device may also display an overlay instruction regarding the need to synchronize the glasses using a mode that allows both eyes to see the desired program at an overlay operation 416. In the case of polarized glasses, the overlay instruction at overlay operation 416 may instead instruct the user to wear the appropriate polarized glasses, such as for player 1/content 1 and for player 2/content2.

Figure 7:
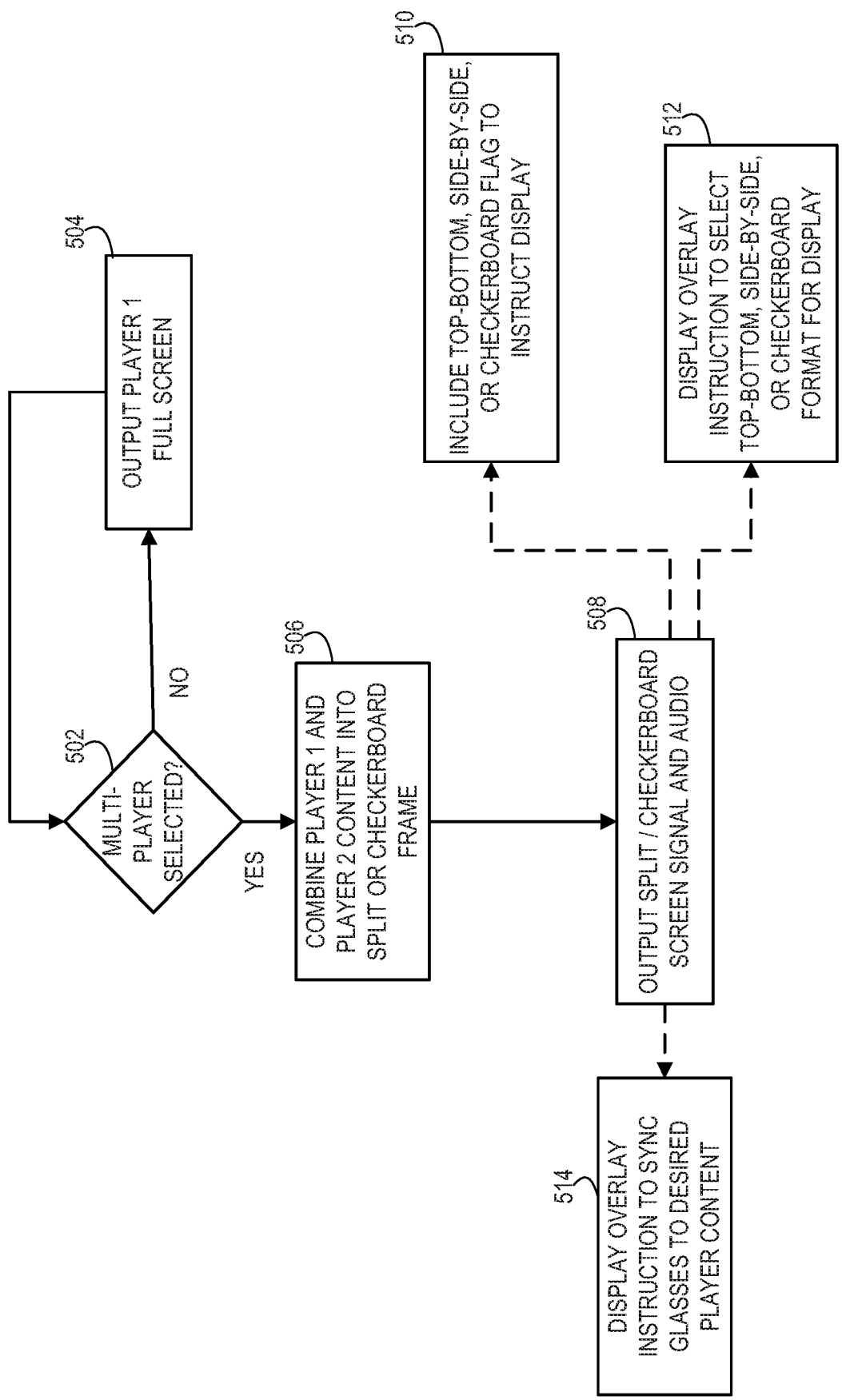
FIG. 7 shows one example of logical operations of a game console or other gaming source to generate multi-player 2D output signal.

FIG. 7 shows an operational flow of one example of a game device, such as a game console. Initially, the game device detects whether a selection has been received to provide multiple player split screen displays at a query operation 502. If not, then the game device outputs player 1 content at full screen at a display operation 504. If such a selection is received, then the game device combines the content of player 1 and player 2 into a split screen format, or if capable a checkerboard format signal, at a combination operation 506. The game device then outputs the signal to the display device at an output operation 508. Because multiplayer games have the audio of both players combined, the game device outputs the audio as usual for split screen mode.

The game device may take additional actions in relation to the multi-player simultaneous output. The game device may include at an insert operation 510 a split screen format flag in the signal being output to the display device to instruct the display device as to which 3D format to enter in order to correctly display the two regions of content as sequential full frames. For instance, the flag may indicate top-bottom, side-by-side, frame packed, or checkerboard. As another example, the source device may produce an overlay that instructs the user to select the proper 3D mode to correctly display the two regions of content as sequential full frames at an overlay operation 512. As another example, in the case of using shutter glasses the game device may also display an overlay instruction regarding the need to synchronize the glasses using a mode that allows both eyes to see the desired player content at an overlay operation 514. In the case of polarized glasses, the overlay instruction at overlay operation 514 may instead instruct the user to wear the appropriate polarized glasses, such as for player 1/content 1 and for player 2/content2.

While the discussion has been in relation to one program per region and one player content per region of a split screen frame, it will be appreciated that each region may have multiple programs or multiple player content. So for instance, the split screen may be broken into quadrants, such as where there is a four player game. Content 1 and 2, such as player 1 and 2 content, may be side-by-side in a top row and content 3 and 4, such as player 3 and 4 content, may be side-by-side in a bottom row. First and second users may view both content 1 and 2 while third and fourth users may view both content 3 and 4 by using a top-bottom 3D mode of the display device, where the top row is one full frame and the bottom row is a subsequent full frame. Likewise, first and third users may view both content 1 and 3 while second and fourth users may view both content 2 and 4 by using a side-by-side 3D mode of the display device, where the left column is one full frame and the right column is a subsequent full frame.

While embodiments have been particularly shown and described, it will be understood by those skilled in the art that various other changes in the form and details may be made therein without departing from the spirit and scope of the invention.

What is claimed is:

1. A system for viewing different content in a full screen, comprising:
   a source device configured to output a frame packed signal that includes a first content in a first spatial region of the frame packed signal and a second content in a second spatial region of the frame packed signal, the frame packed signal having double the vertical resolution or double the horizontal resolution of a full screen resolution of a display device capable of displaying the frame packed signal such that the first spatial region and the second spatial region within the frame packed signal are in the full screen resolution of the display device, such that the frame packed signal is configured such that upon the frame packed signal being displayed the first content is viewable in full screen and the second content is not viewable in full screen by a first viewer using a first pair of glasses that blocks the second content and such that the second content is viewable in full screen and the first content is not viewable in full screen by a second viewer using a second pair of glasses that blocks the first content, and such that the first content and the second content of the frame packed signal are not upscaled to be viewable in full screen.

2. The system of claim 1, wherein the frame packed signal comprises a side-by-side signal with double the horizontal resolution of the display device.

3. The system of claim 1, wherein the frame packed signal comprises a top-bottom signal with double the vertical resolution of the display device.

4. The system of claim 1, wherein the source device is configured to output a flag that instructs the display device to switch to a frame packed display mode to display the first content and the second content.

5. The system of claim 1, further comprising the display device that is coupled to the source device and that displays the frame packed signal.

6. The system of claim 1, wherein the source device is a game console, wherein the first content is a first player game content, and wherein the second content is a second player game content.

7. A system for providing a first content and a second content in a full screen, comprising:
   a source device configured to output a frame packed signal that includes the first content in a first spatial region of the frame packed signal and the second content in a second spatial region of the frame packed signal such that the first spatial region and the second spatial region each has an aspect ratio matching a full screen aspect ratio of a display device capable of displaying the frame packed signal, such that upon the frame packed signal being displayed the first content is viewable in full screen and the second content is not viewable in full screen by a first viewer using a first pair of glasses that blocks the second content while the second content is viewable in full screen and the first content is not viewable in full screen by a second viewer using a second pair of glasses that blocks the first content, and such that the first content and the second content of the frame packed signal are not upscaled to be viewable in full screen.

8. The system of claim 7, further comprising the display device that is coupled to the source device and that displays the frame packed signal.

9. The system of claim 7, wherein the source device is configured to output a flag to the display device that instructs the display device to switch to a frame packed display mode to display the first content and the second content.

10. The system of claim 7, wherein the source device is a game console, wherein the first content is a first player game content, and wherein the second content is a second player game content.

* * * * *